United States Patent
Liebich et al.

(10) Patent No.: US 7,802,461 B2
(45) Date of Patent: Sep. 28, 2010

(54) METHOD AND DEVICE FOR DETECTING LEAKS

(75) Inventors: Jörn Liebich, Köln (DE); Randolf Rolff, Kerpen (DE); Ralf Kilian, Köln (DE)

(73) Assignee: Inficon GmbH, Cologne (DE)

( * ) Notice: Subject to any disclaimer, the term of this patent is extended or adjusted under 35 U.S.C. 154(b) by 440 days.

(21) Appl. No.: 11/664,235

(22) PCT Filed: Aug. 24, 2005

(86) PCT No.: PCT/EP2005/054166

§ 371 (c)(1),
(2), (4) Date: May 15, 2008

(87) PCT Pub. No.: WO2006/040213

PCT Pub. Date: Apr. 20, 2006

(65) Prior Publication Data

US 2009/0013766 A1    Jan. 15, 2009

(30) Foreign Application Priority Data

Oct. 16, 2004    (DE) ................. 10 2004 050 762

(51) Int. Cl.
G01M 3/02 (2006.01)
G01M 3/26 (2006.01)
(52) U.S. Cl. .............. 73/1.07; 73/40.5 R; 73/40.7; 702/50; 702/51
(58) Field of Classification Search ............ 73/1.02, 73/1.06, 1.07, 40, 40.5 R, 40.7; 702/50, 702/51
See application file for complete search history.

(56) References Cited

U.S. PATENT DOCUMENTS

| 3,581,195 | A  | * | 5/1971  | Jepsen .................. 324/470 |
| 4,369,661 | A  | * | 1/1983  | Gibb .................... 73/755 |
| 5,681,983 | A  | * | 10/1997 | Seigeot ................. 73/40.7 |
| 5,786,529 | A  | * | 7/1998  | Voss et al. ............. 73/40.7 |
| 5,889,199 | A  | * | 3/1999  | Wong et al. ............ 73/40 |
| 5,948,969 | A  | * | 9/1999  | Fierro et al. .......... 73/40.5 R |
| 6,286,362 | B1 | * | 9/2001  | Coffman et al. ........ 73/40.7 |
| 6,415,650 | B1 | * | 7/2002  | Bohm et al. ........... 73/40.7 |
| 6,484,563 | B1 | * | 11/2002 | Enquist et al. ........ 73/31.06 |
| 6,714,878 | B2 | * | 3/2004  | Vyers .................. 702/45 |
| 6,859,737 | B2 | * | 2/2005  | Kimoto et al. ......... 702/24 |
| 7,062,954 | B2 | * | 6/2006  | Vittozzi et al. ........ 73/40.7 |
| 7,434,477 | B2 | * | 10/2008 | Lull et al. ............ 73/861 |
| 2001/0006003 | A1 | * | 7/2001  | Lehmann ............... 73/49.3 |
| 2002/0120411 | A1 | * | 8/2002  | Fierro et al. .......... 702/51 |

\* cited by examiner

*Primary Examiner*—David A. Rogers
(74) *Attorney, Agent, or Firm*—Marjama Muldoon Blasiak & Sullivan LLP

(57) ABSTRACT

In leak detection, the signal generated by a test gas is superposed by interferences which fade as the vacuum generation in a container proceeds. Depending on the negative slope of the volume signal (MS), a lower indication limit (AG) is calculated. Upon activation of a zero function, the volume signal (MS) is not reduced to zero but only to the level of the indication limit (AG). Any exceeding of the indication limit is identified as a leak. Thus, the maximum sensitivity of the leak detection is guaranteed at any time.

10 Claims, 4 Drawing Sheets

METHOD AND DEVICE FOR DETECTING LEAKS

FIELD OF THE INVENTION

The invention refers to a method for leak detection, wherein gas is drawn off and the presence of test gas is detected in the drawn-off gas.

BACKGROUND OF THE INVENTION

Minute leak rates of a container can be reliably determined by the vacuum method. The smaller the leak rate, the higher the demands regarding purity and final vacuum. In local leak detection, a vacuum pump evacuates the container until the test pressure required for the leak detector is reached. Suspected leaks are then sprayed with a fine test gas jet from outside. Test gas entering the container is pumped off by the vacuum pump and detected by a mass spectrometer.

A test gas frequently used for leak detectors is helium. There is a problem with the restricted selectivity of the mass spectrometer. Water precipitates both on the outside and on the inside of containers used for leakage measuring. The $H_2$ component of water also includes parts whose presence susceptibly interfere with the measuring of helium. At the beginning of the pumping, the amount signal, which is supposed to represent only the amount of test gas, is superposed by a noise value generated by the presence of water or other contaminations. The noise value fades with increasing pumping time to asymptotically approximate a horizontal line. However, this line never reaches a value of zero, since an absolute vacuum can not be achieved, just as well as an absolute absence of leakage can not be achieved. It is thus a matter of the respective application which portion of the fading volume flow characteristic is selected for leakage measuring.

Since the curve of the volume signal fades as the pumping time increases, the sudden occurrence of test gas that causes a rise in the curve of the volume signal is superimposed by the fading background signal. When the background signal decreases to a greater extent than the detection signal rises, no detection signal is determined at all. The corresponding leak is not detected by the leak detector; it remains invisible.

It has been suggested to provide a leak detector with a zero function. Here, the device is equipped with a zero key that may be pressed by the user to subtract the previous signal from the current signal. Thus, the signal amplitude is set to zero. If then the still fading background signal decreases to a larger extent than the volume signal rises due to the leak, a negative signal results in which the signal rise caused by the leak is neither detectable nor measurable.

In the commonly used methods, the user can press the zero key at any time, the background signal being set to zero. As a consequence, a seemingly low leak rate is indicated, whereas the actual leak rate is higher. Such a mode of operation may have fatal consequences. It is important that no leak rate remains unnoticed. On the other hand, one leak rate indicated too much is less problematic.

SUMMARY OF THE INVENTION

It is an object of the present invention to provide a method for leak detection, wherein the safety of leak detection is increased.

According to the invention, signal dithering or signal turbulence of the a measuring signal is determined and evaluated. The signal dithering is the variation of the signal background per unit time. In a first variant of the method, the volume signal is not set to zero by the generation of the command signal usually referred to as the zero signal, but it is merely reduced down to a lower indication limit so that the signal value obtained is still positive. The lower indication limit indicates to what extent a leak can be detected. The function of the zero signal is not blocked. If the leak rate determined is above the lower indication limit, it is indicated; otherwise, it is not indicated. The method does not operate with a zero level. It is determined up to which signal dithering which leak rate is still sufficiently well measurable. Thus, it is automatically indicated which sensitivity the device has at the time the zero signal has been generated by pressing the zero key.

In a second variant of the present method, the signal dithering of the volume signal is also determined. The user sets a so-called "trigger value" that indicates the desired sensitivity of the leak detection; for example, a leak rate value of $10^{-10}$ mbar l/s (millibar times liter per second). The zero function is released only if the signal dithering of the volume signal is smaller than the trigger value. As long as the instability of the volume signal is greater than the trigger value, the zero function is blocked and no leak indication is given. Thus, the user has to wait until the volume signal has quieted so far that the desired sensitivity set by the trigger value is reached.

According to the invention, the zero function is blocked for the user. The zero function is only enabled when, due to the smoothing of the signal, the device can reliably measure leak rates corresponding to the input trigger value.

The invention further refers to corresponding leak detectors for the first and the second variants of the method.

BRIEF DESCRIPTION OF THE DRAWINGS

The following is a detailed description of embodiments of the invention with reference to the drawings, in which.

DETAILED DESCRIPTION

Figure 1:
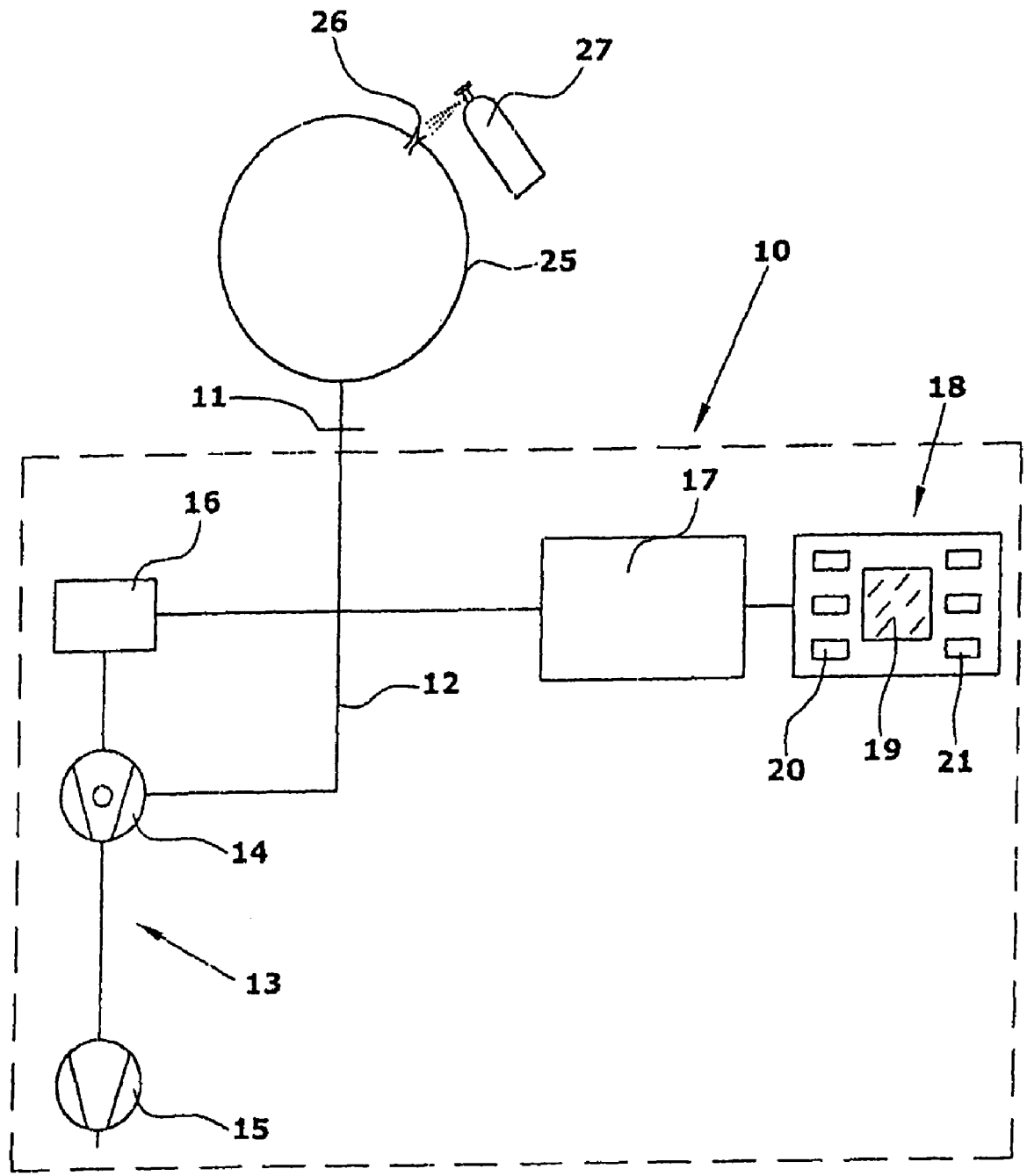
FIG. 1 is a unifilar drawing of a leak detector operating according to the present method.

The leak detector 10 of FIG. 1 comprises an inlet flange 11 to which the container to be tested is connected. A conduit 12 leads from the inlet flange 11 to the vacuum pump device 13. The vacuum pump device 13 is comprised of a turbo molecular pump 14 and a downstream pre-vacuum pump 15. The conduit 12 is connected to a side inlet of the turbo molecular pump 14, the inlet side of which is connected to a mass spectrometer 16. In the turbo molecular pump 14, a test gas, e.g., helium, contained in the drawn-off gas reaches the mass spectrometer 16 in the counter flow to the feed direction, where it is identified. The mass spectrometer 16 supplies the volume signal representing the volume of test gas detected to a microcomputer 17, which executes the treatment described in the following. The microcomputer 17 is connected with a control unit 18 comprising a display device 19, e.g., a monitor, an input device 20 with various keys and a zero key 21.

The container 25 to be examined is connected to the inlet flange 11, the container having a (undesired) leak 26. The leak 26 is sprayed with test gas, e.g. helium, from a spray gun 27. The test gas entering the container 25 reaches the mass spectrometer 16 via the turbo molecular pump 14. The volume of test gas is displayed as the volume signal MS on the display device 19 in the form of a curve and/or as a numerical value.

Figure 3:
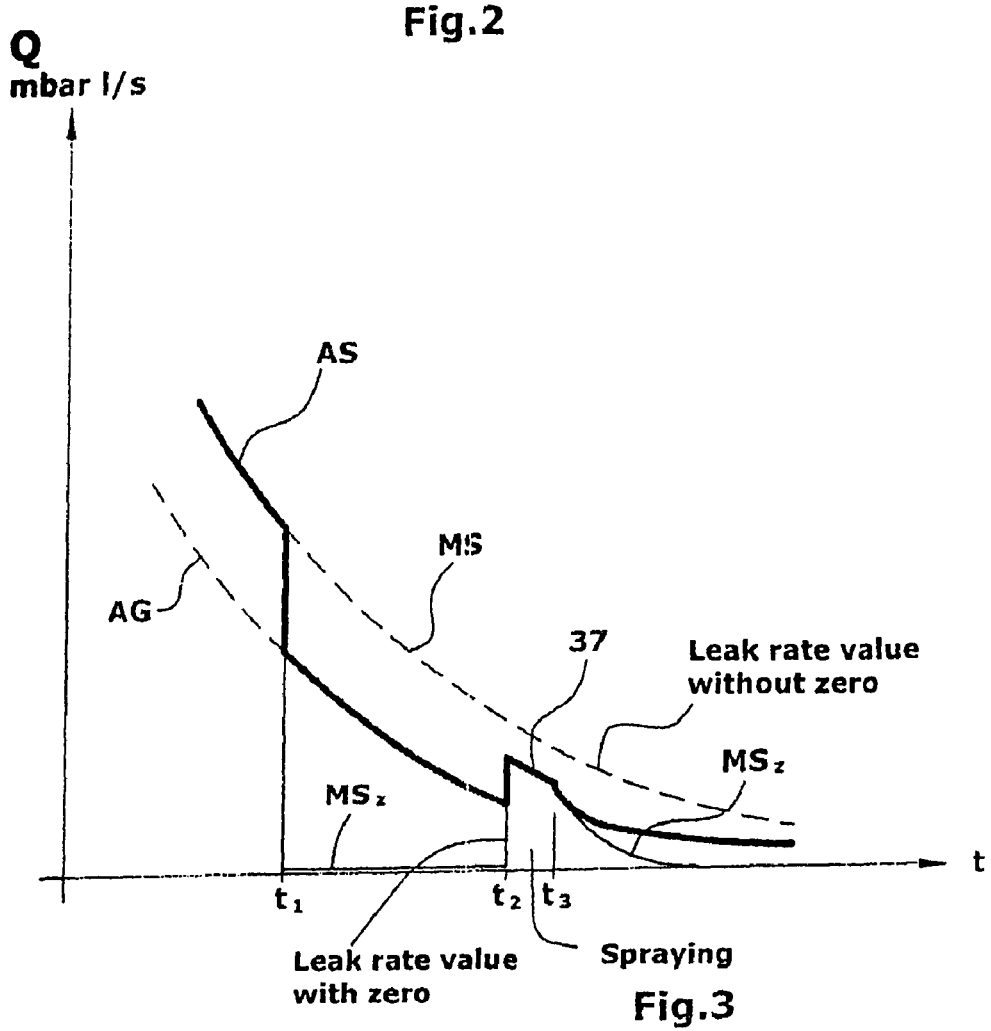
FIG. 3 is a time chart of the volume signal according to the first variant.

As illustrated in FIG. 3, at the beginning of the suction operation, the volume signal MS has a relatively high value. During the suction operation, the volume signal MS fades asymptotically. The high value of the volume signal MS is due to water and other contamination, as well as residual amounts of helium contained in the gas drawn off. Thus, the volume signal MS has a drift that is influenced by external influences. This drift may greatly exceed the measuring signal. The representation of the volume signal MS along the coordinate in FIG. 3 is established logarithmically in decimal powers. The volume signal MS illustrated in the initial part of the curve is obtained in the absence of a leak. It forms the signal background before which a leak is still to be detected.

Figure 2:
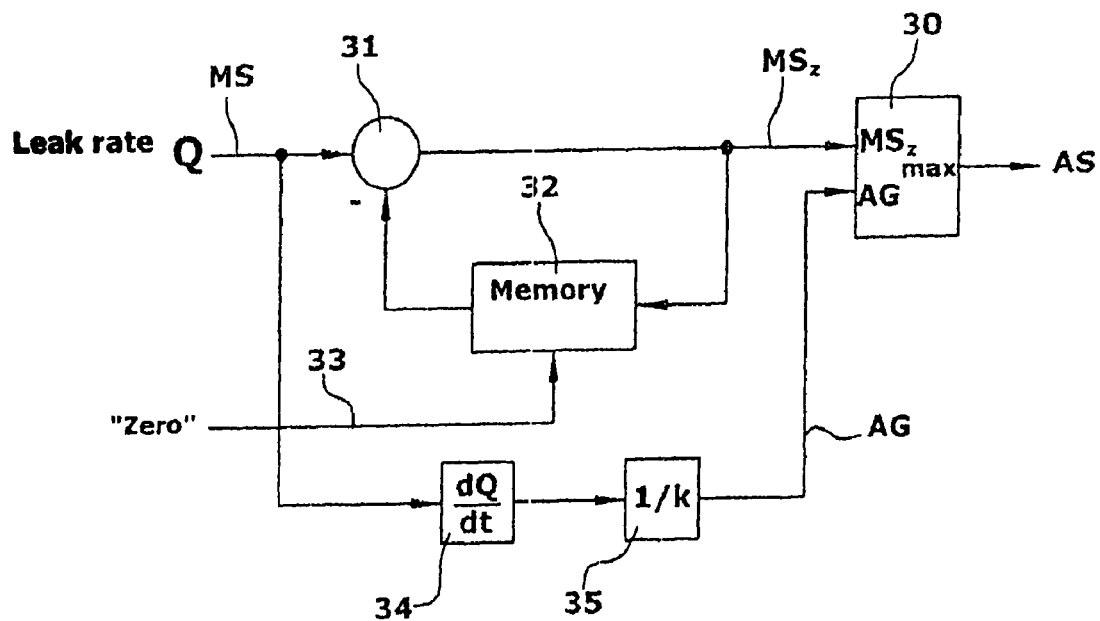
FIG. 2 is a block diagram of a first variant of the method.

FIG. 2 illustrates the structure of an embodiment of the evaluation circuit or of the treatment in the microcomputer 17, respectively. The volume signal MS intended to indicate the leak rate Q is supplied to one input of a maximum value selector 30 via a subtractor. At its subtraction input, the subtractor 31 receives a signal from a memory 32, connected to the output of the subtractor 31. The memory is activated by a "zero" signal on line 33 such that it initiates a subtracting operation wherein the output signal of the subtractor 31 is subtracted from the volume signal MS. This yields the reduced volume signal $MS_z$ which is supplied to the one input of the maximum value selector 30. The entire value of the volume signal is subtracted in the subtractor 31, whereby the value $MS_z$ of zero is obtained.

The volume signal MS is further supplied to a differential circuit 34 which, from the leak rate Q, forms a signal $$\frac{dQ}{dt}$$

representing the signal dithering. This signal is a time derivation of the leak rate. The stronger the signal, the steeper the decline of the volume signal MS is (FIG. 3). The signal from the differential circuit 34 is multiplied by a constant of 1/k. From this, the lower indication limit AG is determined. The value of AG is supplied to the second input of the maximum value selector 30. The maximum value selector selects the highest value among the two input values $MS_z$ and AG. This value will be displayed on the display device as the display signal AS.

FIG. 3 illustrates the course of the display signal AS, i.e. the condition with the zero key pressed. It is assumed in FIG. 3 that the zero key 21 is pressed at the time $t_1$ to prepare the detection of a leak. Shortly thereafter, test gas is sprayed against the container 25 using a spray gun 27. The spraying happens at the time $t_2$ and ends at the time $t_3$.

It is apparent that the display signal AS generated by the maximum value selector 30 drops to the value of the indication limit AG at the time $t_1$ because, from the time $t_1$ on, the indication limit AG is greater than the volume signal $MS_z$ then generated by the subtractor 31. If the leak is sprayed at time $t_2$, the measuring signal rises beyond the indication limit AG by the spraying, so that a pulse 37 is generated which, however, fades already during the spraying in accordance with the general drift and eventually ends on the curve of the indication limit AG. The pulse 37 is clearly identifiable within the curve of the display signal AS and is thus detectable as a leak.

After some time, the process of the actuation of the zero key can be repeated, whereupon the container is sprayed again. The lower indication limit AG is fixed and displayed on the display device. A leak may be determined by the variation of the displayed value of AG to a higher value corresponding to the pulse 37. Thus, the display device always indicates the lower indication limit AG at which a leak rate is sufficiently well displayable. A user can thus perform a leak detection with the previously displayed sensitivity while a desired indication limit AG is displayed.

Figure 4:
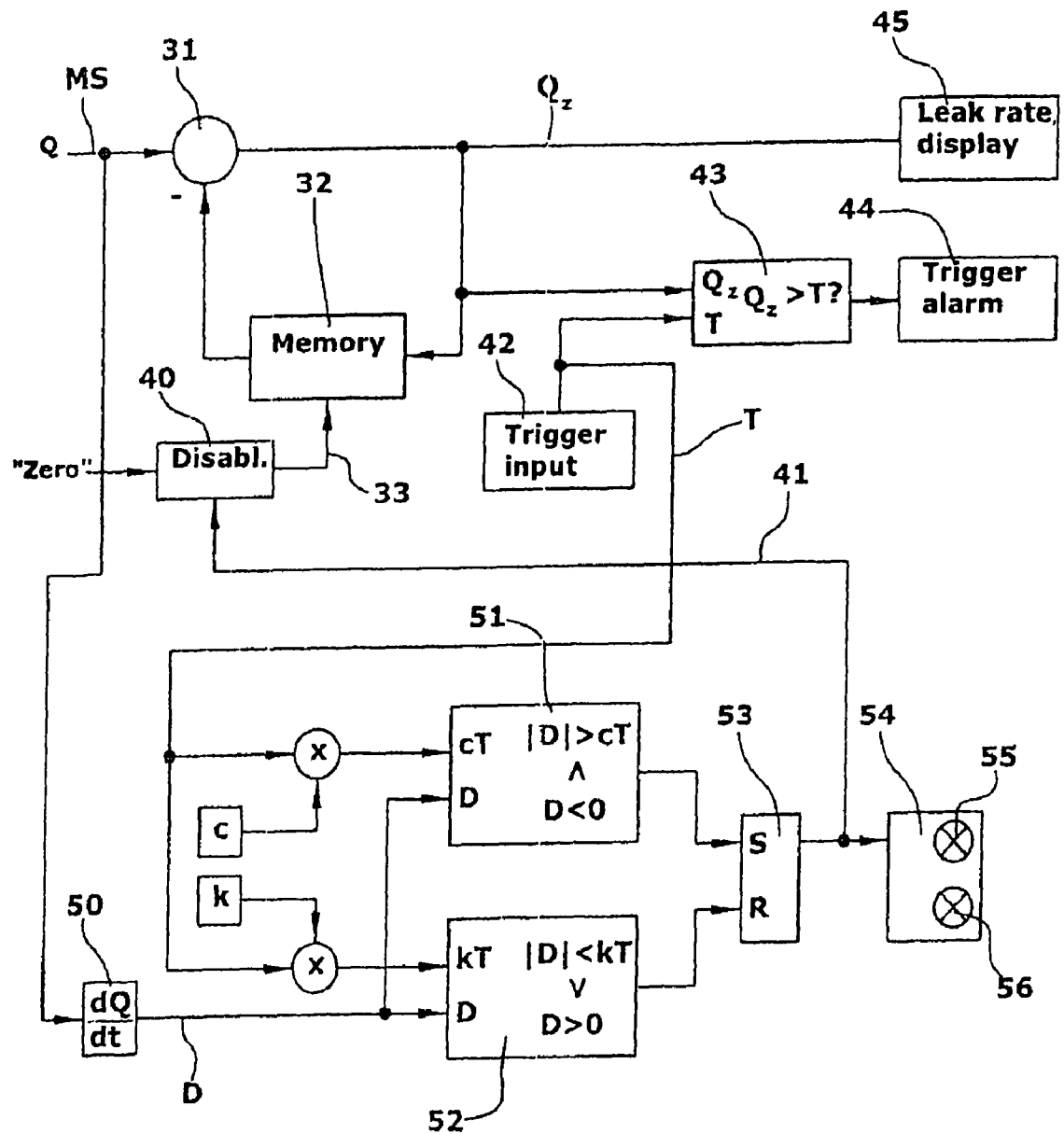
FIG. 4 is a block diagram according to a second variant.

FIG. 4 illustrates an embodiment of the second variant of the invention. Again, the measured leak rate Q is supplied to a subtractor 31 as a volume signal MS. The output of the subtractor is connected with the subtraction input of the subtractor via a memory 32. The signal output from the memory 32 is caused by a signal on line 33. The zero signal inputted by a zero key is supplied to a disabling means 40 generating the signal for line 33. The disabling means 40 is enabled by a signal on line 41.

At a trigger input 42, which may be the input device 20 of FIG. 1, the user will input a trigger value T in mbar*l/s. The trigger value first represents a limit value, the exceeding of which indicates "too big" a leak.

The value $Q_z$ which the measured leak rate ahs assumed after the enabling of the zero function, is supplied to one input of a comparator 43. The other input of the comparator 43 generates an output signal if $Q_z>T$. This output signal activates the trigger alarm 44 that indicates that the volume signal is greater than the inputted trigger value and thus exceeds the limit value. This means the detection of a leak. The size of the leak is indicated at the leak rate display 45 which receives the signal $Q_z$.

The volume signal MS which represents the leak rate Q is supplied to a differential circuit 50 forming the differential quotient $$\frac{dQ}{dt}.$$

The output signal D of the differential circuit 50 indicates the signal dithering of the leak rate Q, i.e. the (negative) slope of the volume signal. The signal D of the differential circuit 50 indicates the signal dithering of the leak rate Q, i.e. the (negative) slope of the volume signal. The signal D is supplied to two logic circuits 51 and 52. The first logic circuit 51 supplies an output signal if the following condition is fulfilled:

$(D<0) \wedge (|D|>c*T)$.

The second logic circuit 52 generates an output signal if the following condition is fulfilled:

$(D>0) \vee (|D|<k*T)$.

Herein

D: indicates the signal dithering in mbar (millibar)*l/s (liters per second) per minute, T: is the set trigger value in mbar*l/s, and c, k: are constant values, where c>k.

Through the selection of the constant values c and k, the minimum duration can be predefined, during which a leak of the size T is visible to a user before it becomes "invisible" again by the negative drift of the leak rate signal. Here, c>k is necessary to obtain a hysteresis between the "disabling" and the "enabling" of the zero function. This function prevents an erroneous operation of the zero function and guarantees that leaks with the size of the set trigger value are detected by the user.

The output signals of the logic circuits 51 and 52 control a flip flop 53 to the output of which the line 41 is connected that controls the disabling means 40. The signal from the logic circuit 51 controls the setting input S and the signal from the logic circuit 52 controls the resetting input R of the flip flop 53. The output of the flip flop is connected with an indicating device 54 having two lights 55, 56 of different colors. The light 55 is lit when the zero function is enabled, and the light 56 is lit when the zero function is disabled.

Figure 5:
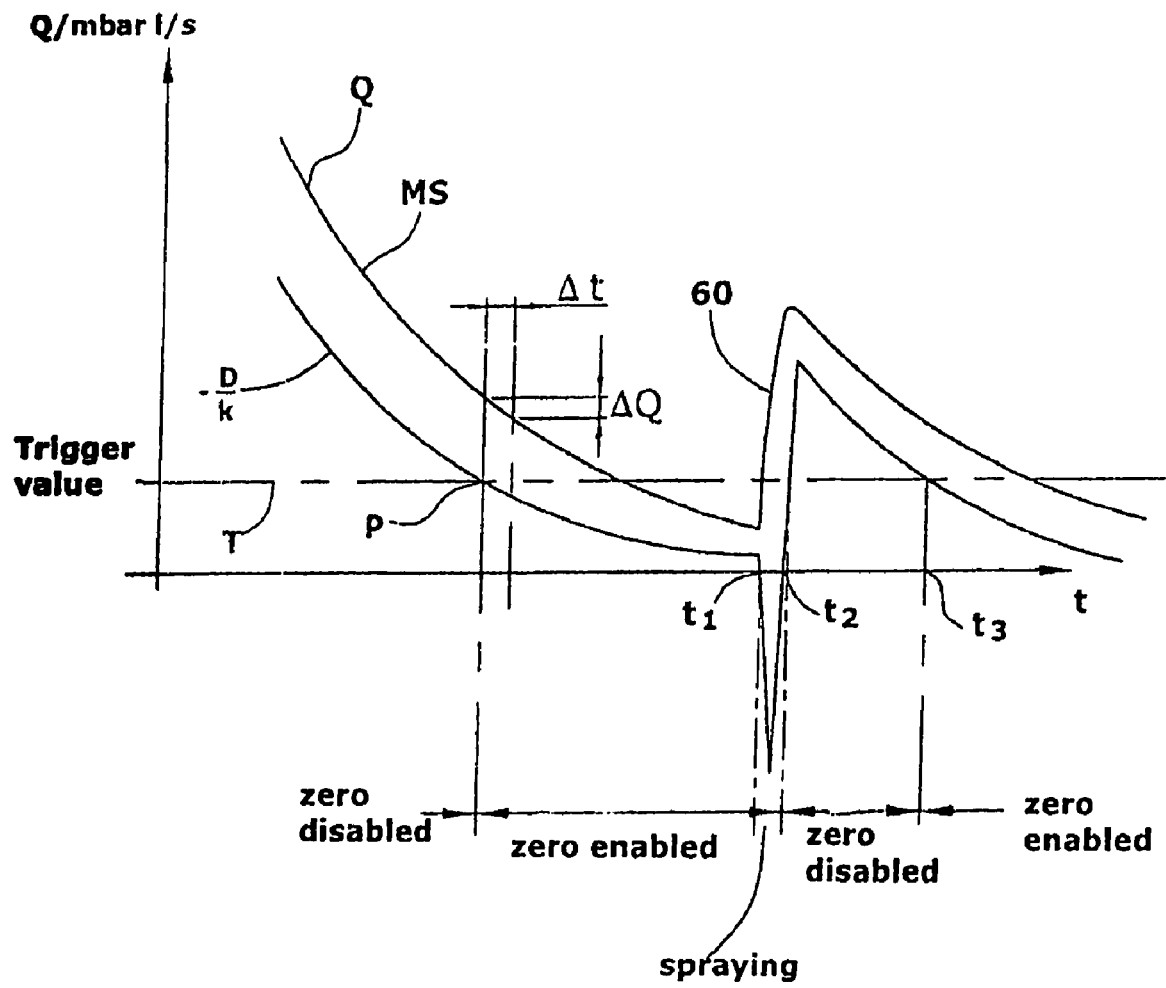
FIG. 5 is a time chart of the volume signal according to the second variant.

FIG. 5 illustrates the course in time of the leak rate Q, forming the volume signal MS. In FIG. 5, the representation of the volume signal MS is also based on decimal powers. From the leak rate Q, the signal dithering D is determined, which is also plotted in FIG. 5 scaled as a curve $$-\frac{D}{k}.$$

The curve $$-\frac{D}{k}$$

intersects the trigger value T at the point P. This means, that the zero function is enabled by the disabling means 40 in FIG. 4. The indicating light 55 is lit. The user may now generate the zero signal manually. From the time $t_1$ to the time $t_2$, the user sprays test gas against the leak using a spray gun 27. This causes a positive rise 60 of the volume signal. From the time $t_2$, the zero function is disabled. As soon as the signal D passes the set trigger value T from the top down again, the zero function is enabled again from the time $t_3$ on. In FIG. 5, the hysteresis caused by the constants c and k is not illustrated for the sake of clarity.

The signal rise 60 indicates a detected leak.

The variant of FIGS. 4 and 5 is based on the determination of whether the leak rate is still measurable with the value of the desired trigger value T. If it is measurable, the zero function is enabled; if it is not measurable, the zero function is disabled.

In the above described embodiments, gas is drawn from a container to check this gas for test gas. In a variation, the invention is also applicable in sniffing leak detection, where a leak is detected by a suctioning probe drawing in ambient air at the site to be checked.

We claim:

1. A leak detection method, said method comprising the steps of:
   drawing off gas;
   detecting test gas in the gas drawn off, and generating a volume signal (MS) corresponding to a measured leak rate (Q);
   treating the volume signal (MS) such that the volume signal is reduced when a zero signal is generated;
   calculating signal dithering $$\left(\frac{dQ}{dt}\right)$$

of the volume signal;
   determining a lower indication limit (AG) from the calculated signal dithering; and
   indicating a leak only if the volume signal (MS) exceeds the lower indication limit (AG).

2. The leak detection method of claim 1, wherein the calculation of the signal dithering $$\left(\frac{dQ}{dt}\right)$$

is effected by obtaining the calculus of the volume signal (MS).

3. The leak detection method of claim 1, including the additional step of dividing the signal dithering by a quotient (k) to obtain the indication limit (AG).

4. The leak detection method of claim 1, including the step of supplying the maximum value of the leak rate (Q) and indication limit (AG) to a leak rate display.

5. A leak detection method, said method comprising the following steps:
   drawing off gas;
   detecting test gas in the gas drawn off, and generating a volume signal (MS) corresponding to the measured leak rate (Q);
   treating the volume signal (MS) such that the volume signal is reduced when a zero signal is generated;
   calculating the signal dithering (D) of the volume signal (MS);
   presetting a trigger value (T); and
   enabling the zero function only if the signal dithering (D) of the volume signal (MS) is less than the trigger value (T).

6. The leak detection method of claim 5, including the additional step of disabling the zero function if the conditions $|D|>c*T$ and $|D|<0$ are fulfilled, where D is the signal dithering of the volume signal (MS), T is a trigger value inputted by the user, and c is a constant value.

7. The leak detection method of claim 5, including the additional step of enabling the zero function if the condition $|D|<k*T$ or the condition $|D|>0$ is fulfilled, where T is a trigger value inputted by the user and k is a constant value.

8. The leak detection method of claim 5, wherein the display device indicates whether the zero function is enabled.

9. A leak detector comprising a vacuum connection, a high vacuum pump device connected with the vacuum connection, a test gas sensor, a microcomputer and a control device including a display device and an input device for a zero signal intended to reduce the volume signal (MS) supplied by the test gas sensor, wherein a differential circuit is provided that, from the volume signal, generates a signal dithering value, from which a lower indication limit (AG) is calculated, and wherein the display device only indicates a leak rate differing from the indication limit if the reduced volume signal (MS) exceeds the indication limit (AG).

10. A leak detector comprising a vacuum connection, a high vacuum pump device connected with the vacuum connection, a test gas sensor, a microcomputer and a control device including a display device and an input device for a zero signal intended to reduce the volume signal (MS) supplied by the test gas sensor, a differential circuit that generates a signal dithering value (D) from the volume signal (MS), a logic means for evaluating the signal dithering (D) and disables or enables a disabling means for the zero signal, and a trigger input supplies a trigger value (T) indicating from which value on the leak rate should be measurable, the disabling means disabling the zero signal below said value.

* * * * *